United States Patent
Aloumanis et al.

(10) Patent No.: US 9,723,206 B1
(45) Date of Patent: Aug. 1, 2017

(54) ENABLING A TRUE SURROUND VIEW OF A 360 PANORAMA VIA A DYNAMIC CYLINDRICAL PROJECTION OF THE PANORAMA

(71) Applicant: VSN TECHNOLOGIES, INC., Fort Lauderdale, FL (US)

(72) Inventors: Peter Aloumanis, Boca Raton, FL (US); Moises De La Cruz, Miramar, FL (US); Tal Mor, Coral Springs, FL (US); Guillermo Padin, Coral Springs, FL (US); Amit Verma, Sunrise, FL (US)

(*) Notice: Subject to any disclaimer, the term of this patent is extended or adjusted under 35 U.S.C. 154(b) by 171 days.

(21) Appl. No.: 14/644,251

(22) Filed: Mar. 11, 2015

(51) Int. Cl.
  *H04N 7/00* (2011.01)
  *H04N 5/232* (2006.01)
  *H04N 13/02* (2006.01)

(52) U.S. Cl.
  CPC ..... *H04N 5/23238* (2013.01); *H04N 13/0203* (2013.01)

(58) Field of Classification Search
  CPC .......... H04N 13/0275; H04N 13/0278; H04N 13/0282; G06T 2207/10021
  See application file for complete search history.

(56) References Cited

U.S. PATENT DOCUMENTS

2015/0130799 A1* 5/2015 Holzer ................ G06F 3/04842
  345/420

* cited by examiner

*Primary Examiner* — Huy T Nguyen
(74) *Attorney, Agent, or Firm* — Patents on Demand P.A.; Brian K. Buchheit; Scott M. Garrett (57) ABSTRACT

A stereographic panoramic media (SPM) can be received. The media can include a 360 degree field of view (FoV) within the horizontal plane and a usable FoV within the vertical plane. A first, second, and third field of view associated with the SPM can be identified. The first FoV can be 180 degree field of view and the second and third FoVs can encompass 90 degree FoV within the horizontal plane. The SPM can be translated to a cylindrical panoramic media (CPM). The CPM can conforms to a three dimensional hollow cylindrical projection (CP). The first FoV of the SPM can be mapped onto the inner surface of the CP, and the first and the second field of view can be mapped onto the outer surface. The CPM can provide a visible continuous field of view of at least 270 degrees.

20 Claims, 5 Drawing Sheets

ENABLING A TRUE SURROUND VIEW OF A 360 PANORAMA VIA A DYNAMIC CYLINDRICAL PROJECTION OF THE PANORAMA

BACKGROUND

The present invention relates to the field of digital photography and, more particularly, to enabling a true surround view of a 360 panorama via a dynamic cylindrical projection of the panorama.

Increasingly, more devices include camera components enabling users to photograph the world around them. As such, many cameras within devices are able to capture panoramic media (e.g., images and/or video) with ease, enabling users to create large 360 degree panoramic media. These panoramas often vary in dimensions, projection type, and quality based on the camera components utilized to capture the photographs. Frequently, panoramic cameras often utilize traditional image sensors to capture a 360 degree view of a real world environment. These image sensors produce a stereographic projection of the real world view as an image. For example, images captured with a 360 degree camera appear as a "little world" doughnut image (e.g., circular image). These projections of the real world as an image often become distorted due to transformations that must be performed to present a three dimensional view (e.g., real world) within a two dimensional view (e.g., computer screen). As a result, 360 degree panoramas are often incomplete or incomprehensible when displayed on a computer screen.

BRIEF SUMMARY

One aspect of the present invention can include a system, an apparatus, a computer program product, and a method for enabling a true surround view of a 360 panorama via a dynamic cylindrical projection of the panorama. A stereographic panoramic media (SPM) can be received. The media can include a 360 degree field of view (FoV) within the horizontal plane and a usable FoV within the vertical plane. A first, second, and third field of view associated with the SPM can be identified. The first FoV can be 180 degree field of view and the second and third FoVs can encompass 90 degree FoV within the horizontal plane. The SPM can be translated to a cylindrical panoramic media (CPM). The CPM can conform to a three dimensional hollow cylindrical projection (CP). The first FoV of the SPM can be mapped onto the inner surface of the CP, and the first and the second field of view can be mapped onto the outer surface. The CPM can provide a visible continuous field of view of at least 270 degrees.

Another aspect of the present invention can include a method, an apparatus, a computer program product, and a system for enabling a true surround view of a 360 panorama via a dynamic cylindrical projection of the panorama. A transform engine can be configured to transform a stereographic panoramic media to a cylindrical panoramic media. The stereographic panoramic media can conform to a stereographic projection. The media can include a 360 degree field of view within the horizontal plane and a vertical field of view determined by the internal components of the camera 112. The cylindrical panoramic media can provide a continuous unobstructed 360 field of view within the horizontal plane. The cylindrical panoramic media can conform to a three dimensional hollow cylindrical projection. A data store can be able to persist a transform mapping a stereographic panoramic media, and a cylindrical panoramic media.

DETAILED DESCRIPTION

The present disclosure is a solution for enabling a true surround view of a 360 degree panorama via a dynamic cylindrical projection of the panorama. In the solution, a stereographic panoramic media can be transformed and presented within as a cylindrical panoramic media without obscuring the 360 degree field of view. In one embodiment, the cylindrical panoramic media can be mapped onto the inner surface of a cylindrical projection and the outer surface of the cylindrical projection. In the embodiment, a 180 degree field of view can be mapped to the inner surface and two 90 degree fields of view can be mapped on the outer surface enabling media continuity to be maintained.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
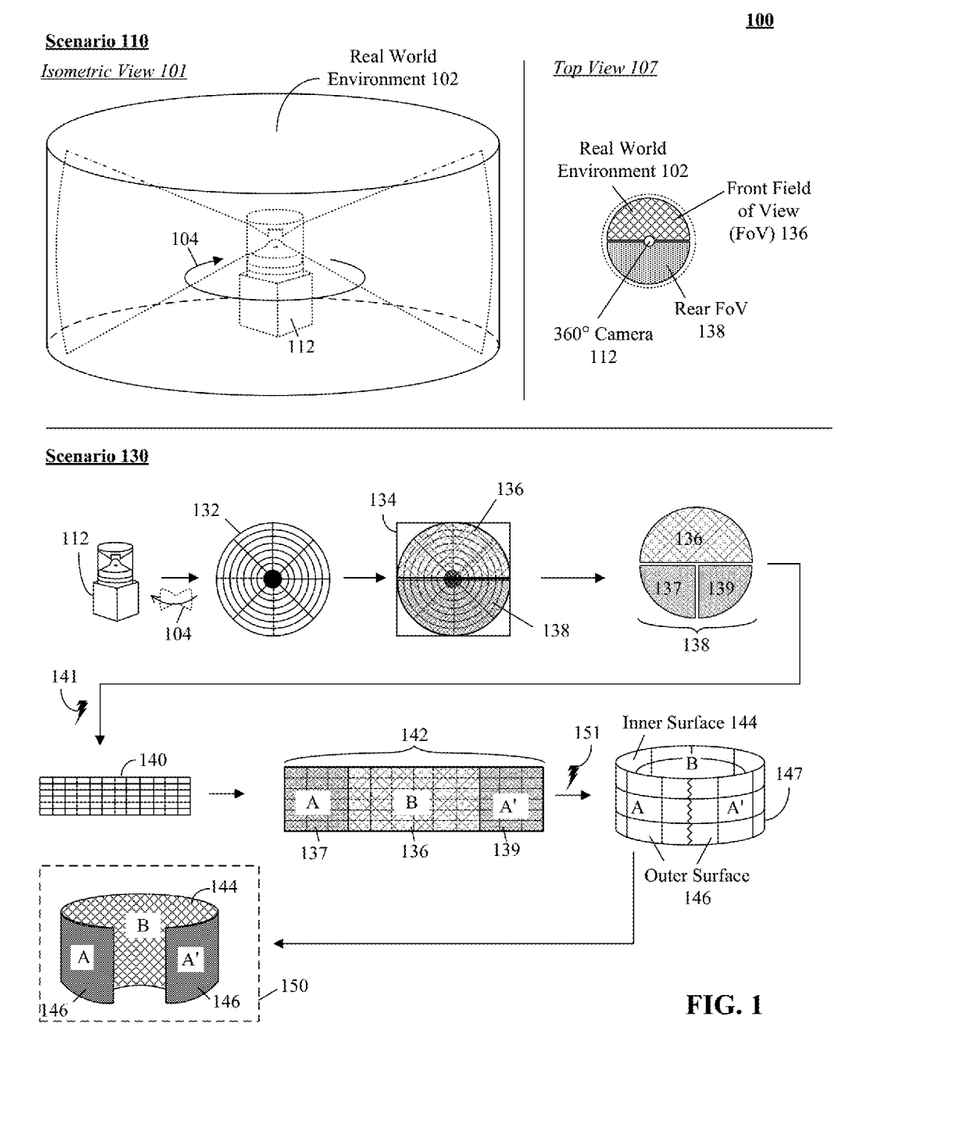
FIG. 1 is a schematic diagram illustrating a set of scenarios for enabling a true surround view of a 360 panorama via a dynamic cylindrical projection of the panorama in accordance with an embodiment of the inventive arrangements disclosed herein.

FIG. 1 is a schematic diagram illustrating a set of scenarios 110, 130 for enabling a true surround view of a 360 panorama via a dynamic cylindrical projection of the panorama in accordance with an embodiment of the inventive arrangements disclosed herein. Scenario 110, 130 can be performed in the context of scenario 210, and/or embodiments 230, 250, system 300, method 400 and/or embodiments 510.

In scenario 110, a 360 degree camera 112 can capture a panoramic image 134 of a real world environment 102 (e.g., first reference plane). The image 134 can be captured by the image sensor of camera 112 (e.g., second reference plane). The image 134 can be a spherical projection of environment 102. In one instance, the projection 142 can be segmented to create three portions, a segment with a field of view of 180 degrees (e.g., 136) and two segments (e.g., 137, 139) with a corresponding 90 degree field of view. The image 134 can be transformed into a rectilinear projection 142 of environment 102 (e.g., third reference plane). The resulting media 142 (e.g., image) can be mapped onto the inner surface 144 and outer surface 146 of a cylindrical projection 147. That is, the media 142 can be mapped onto a three dimensional hollow cylindrical projection utilizing both inner and outer surfaces to maximize visual field of view. It should be appreciated that the field of view 136 can be determined from any arbitrary point of reference within the 360 degree field of view.

As used herein, a real world environment 102 can be a volumetric space within a geographic region. Field of view 104 can be an angle through which a camera 112 is sensitive to electromagnetic radiation (e.g., light). Field of view (FoV) can include 360 degrees within the horizontal plane and 180 to 270 degrees within the vertical plane. In one instance, field of view 104 can be logically partitioned into two distinct regions based on human vision limitations. In the instance, view 104 can be bisected into two fields of view, a front field of view 136 and a rear field of view 138. For example, the fields of view 136, 138 can represent a person viewing the real world environment 102 where the person's eyes are able to see a front field of view 136 (e.g., approximately 180 degrees) and unable to see a rear field of view 138 (e.g., approximately 180 degrees).

As used herein, 360 degree camera 112 can be an optical capture device with a field of view approximately equivalent or greater to the field of view 104. 360 degree camera 112 can include, but is not limited to, a one shot 360 degree camera, a 360 video camera, and the like. Camera 112 can conform to traditional and/or proprietary resolution formats including, but not limited to, standard definition (SD), high definition (HD), 4K, and the like. Camera 112 can include one or more optical elements which can capture a field of view 104 of a real world environment. The view 104 can be mapped to stereographic projection 132 as stereographic panorama 134. It should be appreciated that panorama 134 does not have to conform to a stereographic panorama and can conform to any traditional and/or proprietary panoramas. For example, a typical "rectilinear panoramic strip" such as the panoramic images taken with a camera imager that rotates around a vertical axis can be utilized.

Stereographic projection 132 can be a geometric mapping of a sphere to plane. In one instance, projection 132 can be mapped to a polar coordinate system, a Cartesian coordinate system, and the like. In one instance, field of view 104 can be mapped to a stereographic panoramic media 134 which can conform to a "donut" shape. In the instance, the panorama media 134 can lack pixel data with the center of the media resulting in a "blank area." In one embodiment, the media 134 can be bisected into two 180 degree fields of view 136, 138. In the embodiment, field of view 138 can be bisected into two 90 degree fields of view. It should be appreciated that the fields of view can be automatically or manually determined from any arbitrary angle.

The fields of view 136, 137, 139 can be mapped to a rectilinear projection 140 resulting in rectilinear panoramic media 142. Rectilinear projection 140 can be a type of projection for mapping a portion of a surface of a sphere (e.g., or circular mapping) to a flat image. In one instance, field of view 136 (e.g., 180 degrees) can be mapped to the middle of the rectilinear projection and field of views 137, 139 (e.g., 90 degrees each) can be arranged on either side. That is, the media 134 can be arranged into a rectilinear panoramic media which interrupts the continuity of the original stereographic panoramic media 134. For example, FoV 137 (e.g., A) can be mapped to the left, FoV 136 (e.g., B) can be mapped to the center and FoV 139 (e.g., A') can be mapped to the right.

In one embodiment, a projective transform can be utilized to map stereographic panoramic media 142 to a cylindrical projection 147. Cylindrical projection 147 can be a projection in which vertical lines from a spherical surface are mapped to equally spaced vertical lines and horizontal lines from the spherical surface are mapped to horizontal lines. In the embodiment, FoV 136 (e.g., B) can be mapped to the inner surface of the projection and FoV 137, 139 can be mapped to the outer surface. That is, the disclosure can utilize both inner and outer surfaces of the projection to present the full field of view captured in media 134 as cylindrical panoramic media 150. It should be appreciated that cylindrical projection can be seamless or can have distinct ends (e.g., media 150) permitting an entire 360 field of view to be viewed.

Figure 5:
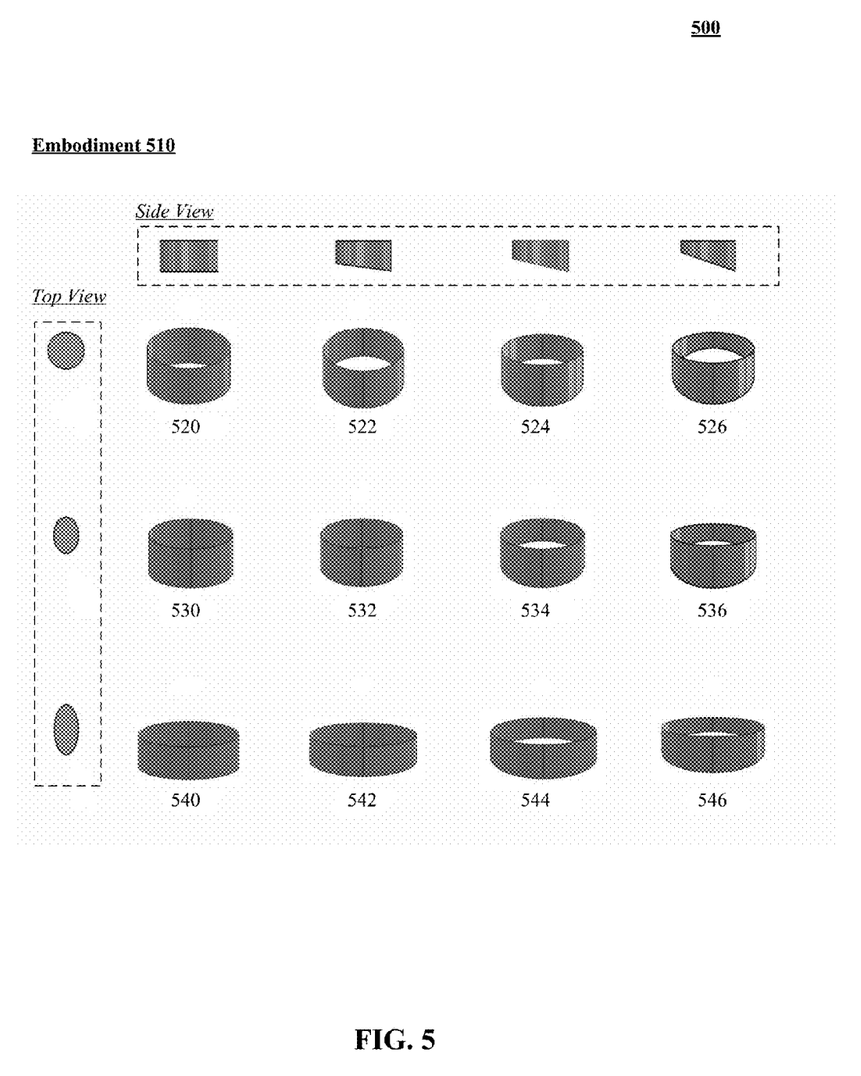
FIG. 5 is a schematic diagram illustrating a set of embodiments 500 for enabling a true surround view of a 360 panorama via a dynamic cylindrical projection of the panorama in accordance with an embodiment of the inventive arrangements disclosed herein.

Drawings presented herein are for illustrative purposes only and should not be construed to limit the invention in any regard. It should be appreciated that FoV 136, 137, 139 can be deformed and/or scaled to fit within different cylindrical geometries (e.g., embodiment 510 geometries 520-546). It should be understood that deformation and/or scaling can be subject to thresholds to minimize and/or limit distortion of media 150. It should be appreciated that the disclosure functionality can support images, video, and the like.

It should be appreciated that in scenario 110, 130, one or more processes and/or transforms can be optional. In one configuration of the disclosure, a projective transform from a stereographic projection 132 to a cylindrical projection 147 can be performed to generate media 150 from media 134.

It should be appreciated that field of view 136 can exceed 180 degrees resulting in field of view 137, 139 to be reduced to less than 90 degrees. Conversely field of view 137,139 can exceed 90 degrees resulting in field of view 136 being less than 180 degrees. It should be appreciated that exact ratios between the field of view is 136 and 137, 139 is arbitrary and can be linked to any algorithmic complexity. Additionally, the ratios can be adjusted based on the geometry of the cylindrical projection embodiment (e.g., embodiments 520-546).

It should be appreciated that cylindrical projection 147 can conform to any cylindrical geometry including, but not limited to, an inverted conical geometry, an inverted conical segment geometry, an inverted oblique conical geometry, a double cone geometry, and the like. In one embodiment, projection 147 can conform to a "shot glass" conical segment. For example, the bottom radius of the projection 147 can be smaller than the top radius of the projection 147.

Figure 2:
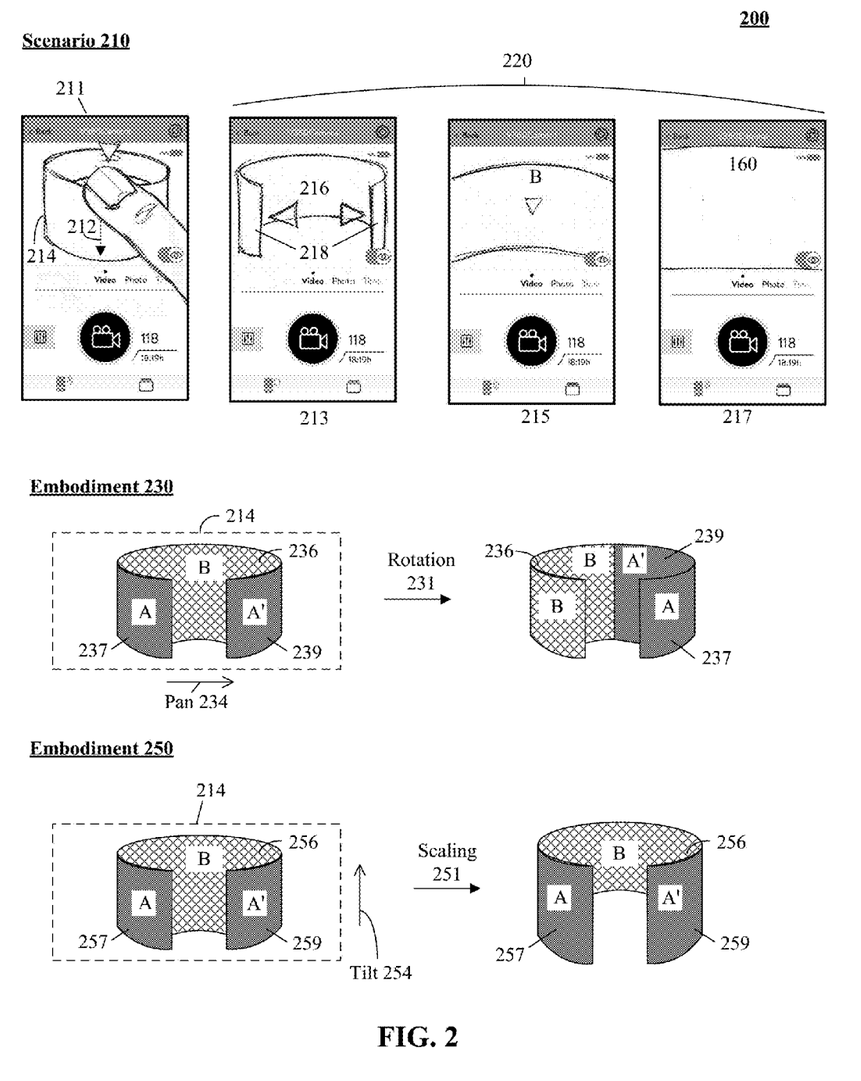
FIG. 2 is a schematic diagram illustrating a set of scenarios and an embodiment for enabling a true surround view of a 360 panorama via a dynamic cylindrical projection of the panorama in accordance with an embodiment of the inventive arrangements disclosed herein.

FIG. 2 is a schematic diagram illustrating a scenario 210 and a set of embodiments 230, 250 for enabling a true surround view of a 360 panorama via a dynamic cylindrical projection of the panorama in accordance with an embodiment of the inventive arrangements disclosed herein. Scenario 210 and embodiments 230, 250 can be performed in the context of scenario 110, 130, system 300, method 400 and/or embodiment 510.

Scenario 210 can illustrate a set of interfaces 211, 213, 215, 217 associated with an interaction with a cylindrical panoramic media 214 (e.g., media 150). In interface 211, a user interaction 212 can trigger a distortion of a cylindrical projection 214 of a 360 degree panorama. For example, the user interaction 212 can be a stroke gesture which creates a line down the vertical axis of the panorama 214. In one instance, the interaction 212 can trigger an animation which "unwraps" the cylindrical projection (e.g., sequence 220). In the instance, the animation 220 can open the cylindrical projection 214 to reveal the inner surface 216 and the outer surface 218 of the cylindrical projection. In one configuration of the instance, the animation can trigger an unwrap and zoom action to be performed, resulting in interface 211 presenting a 180 degree field of view (e.g., FoV 136) of the cylindrical panorama 214 which encompasses a significant portion of the viewing area within interface 217. It should be appreciated that the animation sequence 220 can be arbitrarily complex and can present any portion of the panoramic media 214.

It should be appreciated that surfaces 218 can go through scaling and/or deformation resulting from panning, zoom, and/or tilting panorama 214.

Embodiment 230 illustrates a deformation and/or scaling resulting from a pan 234 action performed on cylindrical panoramic media 214. It should be appreciated that pan 234 can be triggered from a user interaction (e.g., gesture) within interface 211. In embodiment 230, a field of view (FoV) 236 (e.g., B) can be mapped to the inner surface of a cylindrical projection and FoV 237, 239 (e.g., A, A') can be mapped to the outer surfaces. In one instance, pan 234 can trigger the media 212 to rotate 231 around the inner and outer surfaces. For example, a pan of 90 degrees to the right can cause FoV 236 to move left, resulting in a portion of FoV 236 being mapped to the inner surface of the cylindrical project and a portion of FoV 236 being mapped to the outer surface, FoV 239 can be mapped to the inner, and FoV 237 can be mapped to the outer surface, replacing FoV 239. That is the image can be rotated counter clockwise without resulting in field of view or visibility loss of the media (e.g., obscured regions).

Embodiment 250 illustrates a deformation and/or scaling resulting from a tilt 254 action performed on cylindrical panoramic media 214. It should be appreciated that tilt 254 can be triggered from a user interaction (e.g., gesture) within interface 211. In embodiment 230, a field of view (FoV) 236 (e.g., B) can be mapped to the inner surface of a cylindrical projection and FoV 237, 239 (e.g., A, A') can be mapped to the outer surfaces. In one instance, tilt 254 can trigger media 214 to perceptively scale 251 based on the viewing angle resulting from the quantity of tilt 254. For example, a large tilt downwards (e.g., viewing angle is from above) can result in outer surfaces 257, 259 being enlarged while inner surface 256 can be shrunk.

Drawings presented herein are for illustrative purposes only and should not be construed to limit the invention in any regard. It should be appreciated that the scenario 210 and/or embodiments 230, 250 can deviate from the description herein permitting real world implementations to be achieved.

Figure 3:
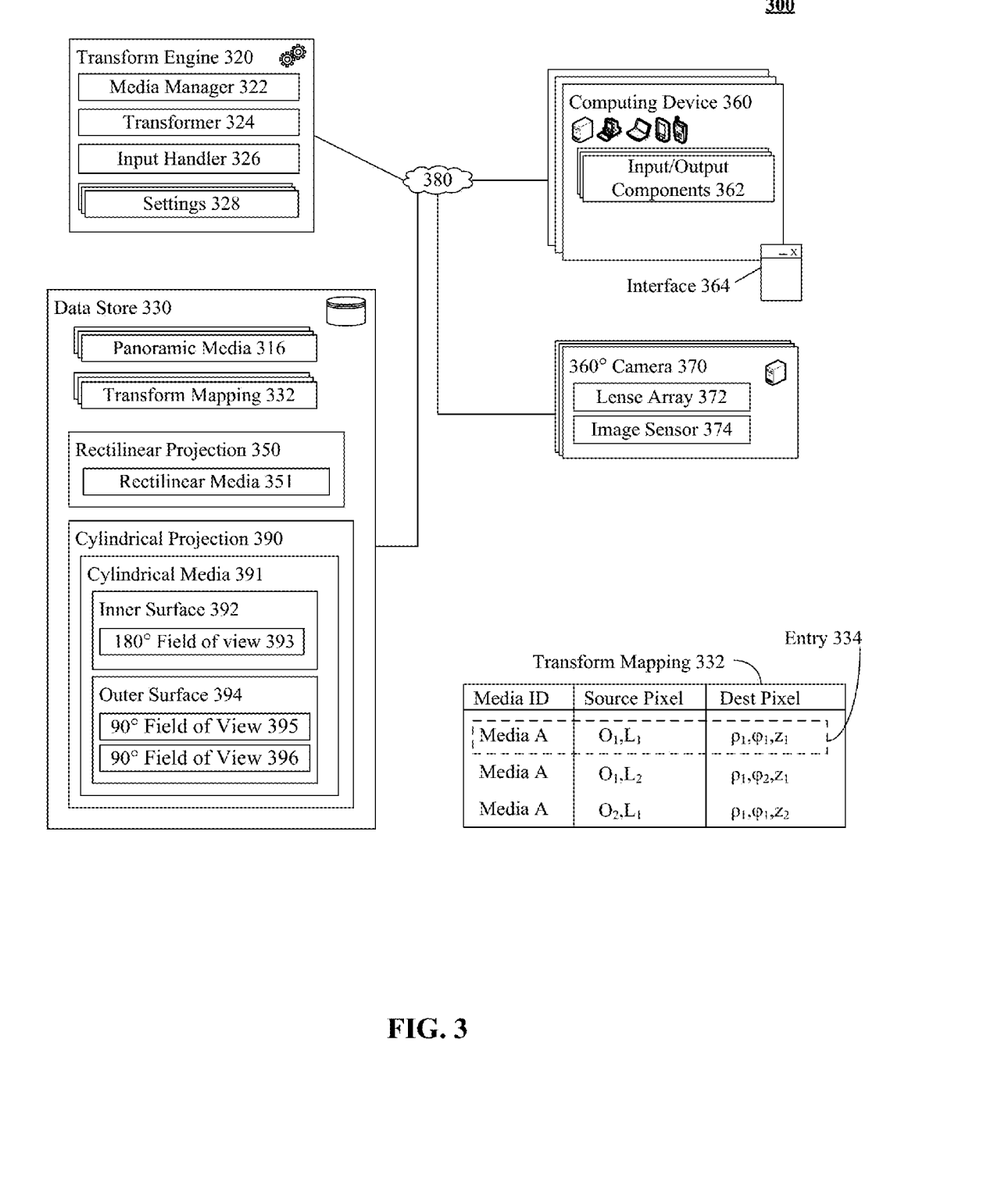
FIG. 3 is a schematic diagram illustrating a system for enabling a true surround view of a 360 panorama via a dynamic cylindrical projection of the panorama in accordance with an embodiment of the inventive arrangements disclosed herein.

FIG. 3 is a schematic diagram illustrating a system 300 for enabling a true surround view of a 360 panorama via a dynamic cylindrical projection of the panorama in accordance with an embodiment of the inventive arrangements disclosed herein. System 300 can be present in the context of scenario 110, 130, 210, embodiment 230, 250, method 400, and/or embodiment 520.

Transform engine 320 can be a hardware/software entity for enabling a true surround view of a 360 panorama via a dynamic cylindrical projection of the panorama. Engine 320 functionality can include, but is not limited to, device 360 registration, 360 degree camera 370 calibration functionality, and the like. In one instance, engine 320 can be a functionality of a computing device 360, 360 degree camera 370, and the like. Engine 320 can include, but is not limited to, media manager 322, transformer 324, input handler 326, settings 328, and the like.

Media manager 322 can be a hardware/software entity for managing media obtained by 360 degree camera 370. Manager 322 functionality can include, but is not limited to, media acquisition, media analysis, and the like. In one instance, manager 322 can be utilized to determine media format, restrict media by characteristics (e.g., media with too low resolution can be rejected), and the like. In one embodiment, manager 322 can perform automated image analysis including, but not limited to, object detection, object identification, facial recognition, motion tracking, and the like. In one instance, manager 322 can be utilized to tag media based on content for rapid media organization/routing/processing.

Transformer 324 can be a hardware/software element for performing one or more translations on media 316. Transformer 324 functionality can include, but is not limited to, projection type determination, transform mapping 332 generation, and the like. In one embodiment, transformer 324 can utilize mapping 332 to enable a cylindrical projection to be transformed from a stereographic projection. Mapping 332 can include, but is not limited to, cross coordinate system mapping data, scaling transform data, and the like. For example, entry 334 can include a pixel mapping from a stereographic projection to a cylindrical projection for each pixel point on the stereographic projection.

Input handler 326 can be a hardware/software entity for receiving and/or determining input associated with media 316 and/or interface. Handler 326 functionality can include, gesture detection, gesture determination, and the like. In one embodiment, handler 326 can be utilized to map finger gestures to common pan, tilt, zoom operations associated with media 316. In one instance, handler 326 can be utilized to enable shortcuts for complex media operations.

Settings 328 can be one or more rulesets for establishing the behavior of, engine 320, and/or system 300. Settings 328 can include, but is not limited to, media manager 322 options, transformer 324 settings, input handler 326 parameters, and the like. In one instance, settings 328 can include, but is not limited to, security policies, user preferences, and the like. Setting 328 can be manually and/or automatically determined. In one instance, setting 328 can be configured via interface 364.

Data store 330 can be a hardware/software component able to persist media 316, mapping 332, media 351, 391, and the like. Data store 330 can be a Storage Area Network (SAN), Network Attached Storage (NAS), and the like. Data store 330 can conform to a relational database management system (RDBMS), object oriented database management system (OODBMS), and the like. Data store 330 can be communicatively linked to engine 320, camera 370, and/or device 360 in one or more traditional and/or proprietary mechanisms. In one instance, data store 330 can be a component of Structured Query Language (SQL) complaint database.

Panoramic media 316, 351, 391 can conform to any traditional and/or proprietary formats including, but not limited to, Joint Photographic Experts Group (JPEG), Portable Network Graphics (PNG), RAW, Audio Video Interleave (AVI), Moving Picture Experts Group (MPEG), H.264, and the like. In one instance, media 316, 351, 391 can include metadata, calibration data, and the like. In one embodiment, media 316, 351, 391 can be associated with compression, encryption, and the like. In one instance, rectilinear media 351 can be associated with a rectilinear projection 350. In one embodiment, cylindrical media 391 can be associated with a cylindrical projection 390. In the embodiment, media 391 can be segmented and mapped to an inner surface 392 of projection 390 and an outer surface 394 of projection 390. For example, a 180 degree field of view 393 can be logically mapped to inner surface 392 and two 90 degree fields of view 395, 396 can be mapped to an outer surface of projection 390.

Computing device 360 can be a hardware/software permitting the execution of operating system 363. Device 360 can include, but is not limited to, input/output components 362, operating system, settings, interface 364, and the like. Input/output components 362 can include, but is not limited to, a microphone, a loudspeaker, a display, a transceiver, and the like. Computing device 360 can include, but is not limited to, a desktop computer, a laptop computer, a tablet computing device, a personal digital assistant (PDA), a mobile phone, and the like.

Interface 364 can be a user interactive component permitting interaction and/or presentation of media 391. Interface 364 can be present within the context of a Web browser application, a media management application, and the like. In one embodiment, interface 364 can be a screen of a media based social networking software (e.g., INSTAGRAM, SNAPCHAT). Interface 334 capabilities can include a graphical user interface (GUI), voice user interface (VUI), mixed-mode interface, and the like. In one instance, interface 364 can be communicatively linked to computing device.

360 degree camera 370 can be a hardware/software entity for capturing and/or processing media 316. Camera 370 can include, but is not limited to, a lense array 372, an image sensor 374, a data store, a transceiver, a display, a power source, and the like. In one instance, camera 370 can capture media 316 in real-time and/or near real-time. In the instance, the media 316 can be transformed, conveyed, and presented within an interface 364 in real-time or near real-time. It should be appreciated that the disclosure can support delayed broadcasting, buffering (e.g., for high latency), and the like.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), Virtual Private Network (VPN) and the like.

Drawings presented herein are for illustrative purposes only and should not be construed to limit the invention in any regard. It should be appreciated that engine 310 can be an optional component of engine 320. It should be appreciated that one or more components within system 300 can be optional components permitting that the disclosure functionality be retained. It should be understood that engine 320 components can be optional components providing that engine 320 functionality is maintained. It should be appreciated that one or more components of engine 320 can be combined and/or separated based on functionality, usage, and the like. System 300 can conform to a Service Oriented Architecture (SOA), Representational State Transfer (REST) architecture, and the like.

Figure 4:
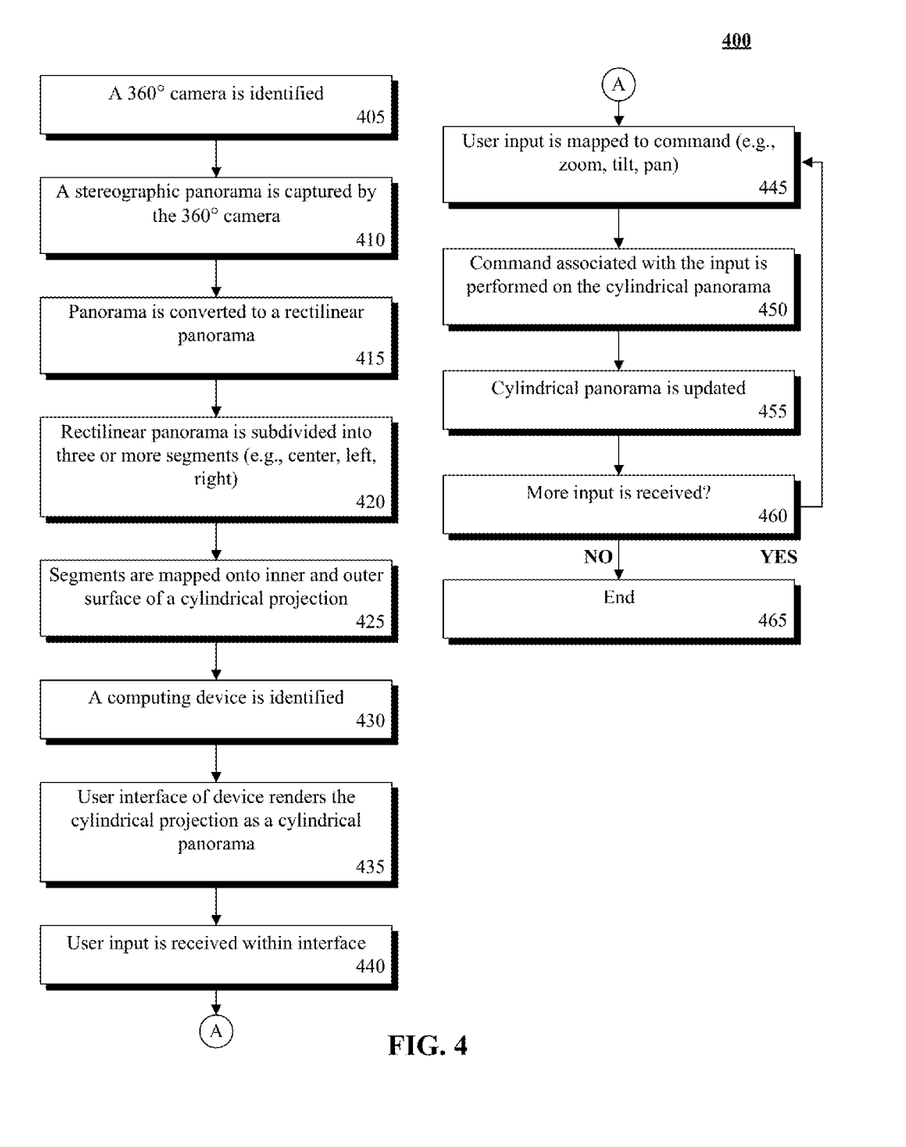
FIG. 4 is a flowchart illustrating a method for enabling a true surround view of a 360 panorama via a dynamic cylindrical projection of the panorama in accordance with an embodiment of the inventive arrangements disclosed herein.

FIG. 4 is a flowchart illustrating a method 400 for enabling a true surround view of a 360 panorama via a dynamic cylindrical projection of the panorama in accordance with an embodiment of the inventive arrangements disclosed herein. Method 400 can be present in the context of scenario 110, 130, 210, embodiments 230, 250, system 300, and/or embodiment 510.

In step 405, a 360 degree camera is identified. In step 410, a stereographic panorama of a real world environment can be captured by the 360 degree camera. In step 415, the panorama can be converted to a rectilinear panorama. In step 420, the rectilinear panorama can be subdivided into three or more segments based on a field of view. In step 425, the segments can be mapped onto the inner and outer surface of a cylindrical projection. In step 430, a computing device can be identified. In step 435, a user interface of the device renders a cylindrical projection as a cylindrical panorama. In step 440, a user input can be received within the interface. In step 445, a user input can be mapped to a command. In step 450, a command associated with the input can be performed on the cylindrical panorama. In step 455, the cylindrical panorama can be updated. In step 460, if more input is received, the method can return to step 445, else continue to step 465. In step 465, the method can end.

FIG. 5 is a schematic diagram illustrating an embodiment 510 for enabling a true surround view of a 360 panorama via a dynamic cylindrical projection of the panorama in accordance with an embodiment of the inventive arrangements disclosed herein. Embodiment 510 can be present in the context of scenario 110, 130, 210, embodiments 230, 250, system 300, and/or method 400.

Embodiment 510 illustrates a set of exemplary cylindrical geometries 520-546 for the disclosure. Geometries 520-546 can be subject to pan, zoom, and tilt operations resulting in deformation/scaling of the geometry with respect to the viewing angle. It should be appreciated that geometries 520-546 can be presented within a virtual camera system such as a perspective (e.g., orthographic) camera permitting a three dimensional view of the geometries. It should be appreciated that the cylindrical geometries are for exemplary purposes only are non-exhaustive and should be construed to be non-limiting.

The flowchart and block diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating an unobstructed cylindrical panorama comprising:
    receiving a stereographic panoramic media, wherein the media comprises of at least a 270 degree field of view within the horizontal plane; and
    translating the stereographic panoramic media to a cylindrical panoramic media, wherein the cylindrical panoramic media conforms to a three dimensional hollow cylindrical projection, wherein the cylindrical projection radius at least one of a uniform and non-uniform length, wherein a first portion of the field of view of the stereographic panoramic media is mapped onto the inner surface of the cylindrical projection, and a second of the field of view of the stereographic panoramic media is mapped onto the outer surface of the cylindrical projection, wherein the cylindrical panoramic media provides a visible continuous field of view of at least 270 degrees.

2. The method of claim 1, further comprising:
    receiving a pan command within an interface presenting the cylindrical panoramic media, wherein the presenting conforms to a virtual orthographic camera view; and
    rotating the first, and second portions of the field of view appropriately, wherein the first portion is at least partially mapped to the outer surface of the cylindrical projection and the second portion of the field of view is at least partially mapped to the inner surface of the cylindrical projection.

3. The method of claim 1, further comprising:
    receiving a tilt command within an interface presenting the cylindrical panoramic media, wherein the presenting conforms to a virtual orthographic camera view; and
    scaling at least a portion of the cylindrical projection based on the angle of tilt associated with the tilt command to approximate a perspective view from the orthographic camera.

4. The method of claim 1, further comprising:
    receiving a zoom command within an interface presenting the cylindrical panoramic media, wherein the presenting conforms to a virtual orthographic camera view; and scaling the cylindrical projection based on the quantity of zoom associated with the zoom command to approximate a perspective view from the orthographic camera.

5. The method of claim 1, further comprising:
scaling the second portion of the field of view to fit into the dimensions of the outer surface of the cylindrical projection.

6. The method of claim 1, further comprising:
unwrapping the cylindrical projection to a rectilinear projection responsive to a user interaction within an interface presenting the cylindrical media; and
mapping the cylindrical panoramic media to a rectilinear projection to generate a rectilinear panoramic media.

7. The method of claim 6, further comprising:
presenting an animation sequence within an interface of the unwrapping of the cylindrical panoramic media to a rectilinear panoramic media.

8. The method of claim 1, further comprising:
adjusting a virtual orthographic camera view of the cylindrical projection; and
deforming the cylindrical panoramic media appropriately to approximate a perspective view from the orthographic camera.

9. The method of claim 1, further comprising:
segmenting the stereographic panoramic media into three segments from an arbitrary point of reference within the field of view of the stereographic panoramic media, wherein the segments comprise of the first and second portion of the field of view.

10. A system for an unobstructed cylindrical panorama comprising:
a transform engine configured to transform a panoramic media to a cylindrical panoramic media, wherein the panoramic media conforms to a stereographic projection, wherein the media comprises of at least a 270 degree field of view within the horizontal plane, wherein the cylindrical panoramic media provides a continuous unobstructed view within the horizontal plane, wherein the cylindrical panoramic media conforms to a three dimensional hollow cylindrical projection; and
a data store able to persist at least one of a transform mapping a panoramic media, and a cylindrical panoramic media.

11. The system of claim 10, further comprising:
a media manager configured to manage at least one of the stereographic panoramic media and the cylindrical panoramic media;
a transformer able to map at least one pixel from the stereographic panoramic media to the cylindrical panoramic media; and
an input handler configured to receive input from an interface and perform an operation on the cylindrical panoramic media.

12. The system of claim 10, further comprising:
the engine, identifying a first field of view, a second field of view and a third field of view associated with the panoramic media, wherein the first field of view is at least 180 degree field of view, wherein the second and third field of views are at least encompassing 90 degree field of view within the horizontal plane.

13. The system of claim 12, further comprising:
the engine, receiving a pan command within an interface presenting the cylindrical panoramic media, wherein the presenting conforms to a virtual orthographic camera view; and
the engine, rotating the first, second, and third field of views appropriately, wherein the wherein the first field of view is at least partially mapped to the outer surface of the cylindrical projection and at least one of the second and third field of view is at least partially mapped to the inner surface of the cylindrical projection.

14. The system of claim 12, further comprising:
the engine, receiving a tilt command within an interface presenting the cylindrical panoramic media, wherein the presenting conforms to a virtual orthographic camera view; and
the engine, scaling at least a portion of the cylindrical projection based on the angle of tilt associated with the tilt command to approximate a perspective view from the orthographic camera.

15. The system of claim 12, further comprising:
the engine, receiving a zoom command within an interface presenting the cylindrical panoramic media, wherein the presenting conforms to a virtual orthographic camera view; and
the engine, scaling the cylindrical projection based on the quantity of zoom associated with the zoom command to approximate a perspective view from the orthographic camera.

16. The claim of system 12, further comprising:
the engine, scaling the second and third field of view to fit into the dimensions of the outer surface of the cylindrical projection.

17. The claim of system 12, further comprising:
the engine, unwrapping the cylindrical projection to a rectilinear projection responsive to a user interaction within an interface presenting the cylindrical media; and
the engine, mapping the cylindrical panoramic media to a rectilinear projection to generate a rectilinear panoramic media.

18. The system of claim 12, further comprising:
the engine, adjusting an virtual orthographic camera view of the cylindrical projection; and
the engine, deforming the cylindrical panoramic media appropriately to approximate a perspective view from the orthographic camera.

19. The system of claim 12, further comprising:
the engine, segmenting the stereographic panoramic media into three segments from an arbitrary point of reference within the field of view of the stereographic panoramic media, wherein the segments comprise of the first, second, and third field of views.

20. A non-transitory computer readable storage medium having computer usable program code embodied therewith, the computer usable program code comprising:
computer usable program code stored in the computer readable storage medium, if said computer usable program code is executed by a processor it is operable to receive a stereographic panoramic media, wherein the stereographic panoramic media conforms to a stereographic projection, wherein the media comprises of at least a 270 degree field of view within the horizontal plane;
computer usable program code stored in the computer readable storage medium, if said computer usable program code is executed by a processor it is operable to identify a first field of view, a second field of view and a third field of view associated with the panoramic media, wherein the first field of view is at least 180 degree field of view, wherein the second and third field of views are at least encompassing 90 degree field of view within the horizontal plane; and computer usable program code stored in the computer readable storage medium, if said computer usable program code is executed by a processor it is operable to translate the stereographic panoramic media to a cylindrical panoramic media, wherein the cylindrical panoramic media conforms to a three dimensional hollow cylindrical projection, wherein the first field of view of the stereographic panoramic media is mapped onto the inner surface of the cylindrical projection, and a first and a second field of view of the stereographic panoramic media is mapped onto the outer surface of the cylindrical projection, wherein the cylindrical panoramic media provides a visible continuous field of view of at least 270 degrees.

\* \* \* \* \*